(12) United States Patent
Army et al.

(10) Patent No.: US 10,259,588 B2
(45) Date of Patent: Apr. 16, 2019

(54) J-TUBE SHROUD

(71) Applicant: Hamilton Sundstrand Corporation, Charlotte, NC (US)

(72) Inventors: Donald E. Army, Enfield, CT (US); Christopher McAuliffe, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 151 days.

(21) Appl. No.: 15/620,381

(22) Filed: Jun. 12, 2017

(65) Prior Publication Data

US 2018/0354627 A1 Dec. 13, 2018

(51) Int. Cl.
| | |
|---|---|
| F25B 47/00 | (2006.01) |
| B64D 13/08 | (2006.01) |
| F25B 9/00 | (2006.01) |
| B64D 13/06 | (2006.01) |

(52) U.S. Cl.
CPC .............. B64D 13/08 (2013.01); B64D 13/06 (2013.01); F25B 9/004 (2013.01); F25B 47/006 (2013.01); B64D 2013/0651 (2013.01); B64D 2013/0662 (2013.01)

(58) Field of Classification Search
CPC ................................. F25B 47/006; F25B 9/004
See application file for complete search history.

(56) References Cited

U.S. PATENT DOCUMENTS

| 5,311,749 A * | 5/1994 | McAuliffe ................ F02C 3/32 |
| | | 415/12 |
| 7,402,020 B2 | 7/2008 | Beers et al. |
| 7,607,308 B2 | 10/2009 | Kraft et al. |
| 8,418,495 B2 * | 4/2013 | Merritt .................. B64D 13/06 |
| | | 415/216.1 |
| 8,679,210 B2 | 3/2014 | McAuliffe et al. |
| 2006/0061221 A1 | 3/2006 | McAuliffe et al. |
| 2012/0156008 A1 * | 6/2012 | Chrabascz ............... F16J 15/44 |
| | | 415/170.1 |

FOREIGN PATENT DOCUMENTS

| EP | 2617648 A1 | 7/2013 |
| EP | 2677140 A2 | 12/2013 |
| EP | 2746588 A2 | 6/2014 |

OTHER PUBLICATIONS

Extended European Search Report for EP Application No. 18176074.5, dated Sep. 10, 2018, 7 pages.

* cited by examiner

*Primary Examiner* — Filip Zec
(74) *Attorney, Agent, or Firm* — Kinney & Lange, P.A.

(57) ABSTRACT

A shroud for a J-tube of an air conditioning pack of an aircraft includes a first partial shroud piece and a second partial shroud piece that mate together to form a flow tube and a sleeve. The flow tube includes an inlet, an outlet fluidly connected to the inlet and disposed on an opposite end of the flow tube from the inlet, and a sidewall extending between the inlet and the outlet. The sleeve extends through a portion of the flow tube and out of the sidewall and is configured to contain a portion of the J-tube.

19 Claims, 7 Drawing Sheets

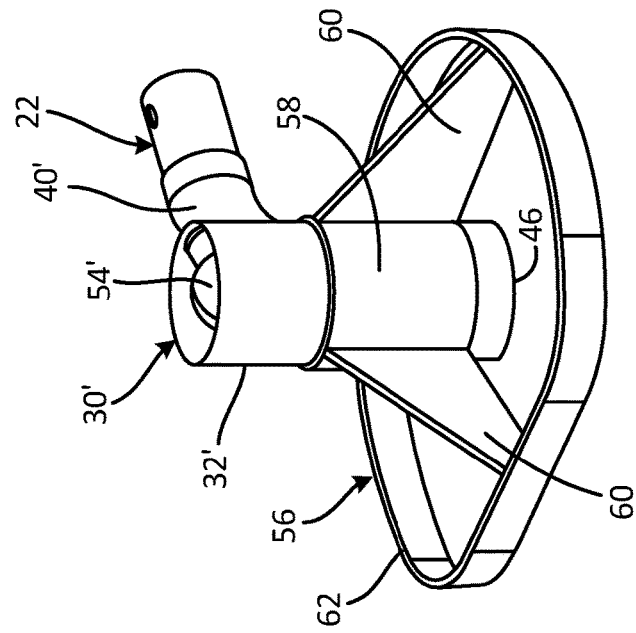
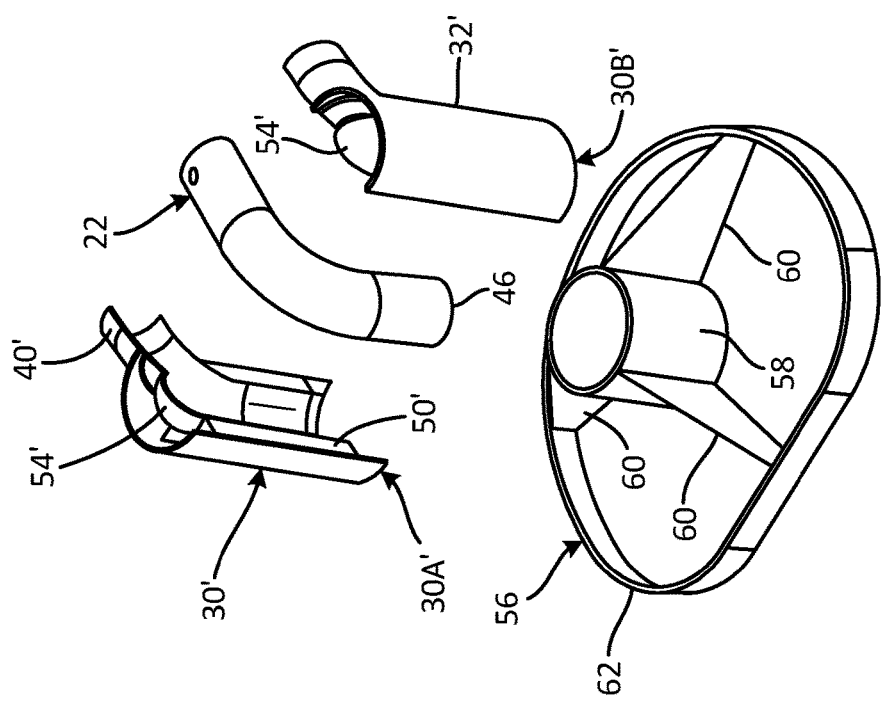

J-TUBE SHROUD

BACKGROUND

The present disclosure is directed generally to air conditioning packs ("ACPs"), and more specifically, to a J-tube for an ACP.

Air cycle machines ("ACMs") are used as part of ACPs for processing a pressurized air source, such as bleed air from a gas turbine engine of an aircraft. ACMs compress air in a compressor section which is discharged to a downstream heat exchanger and further routed to a turbine. The turbine extracts energy from the expanded air to drive the compressor. The air output from the turbine is utilized as an air supply for a vehicle, such as the cabin of an aircraft. ACMs are used to achieve a desired pressure, temperature, and humidity in the air that is transferred to the environmental control system of the aircraft to provide cooled air to the aircraft cabin and cockpit.

The ACM rotative assembly is typically supported by one or more bearings that heat up during operation of the ACP. In order to cool the bearings, a cooling flow is passed from a J-tube connected to the air cycle machine and is directed to the bearings for cooling. Fine particle contamination and water ingress into the ACM bearing cooling circuit can cause damage to the bearings, degrade bearing capacity, and contribute to premature failure of the ACM.

SUMMARY

A shroud for a J-tube of an air conditioning pack of an aircraft includes a first partial shroud piece and a second partial shroud piece that mate together to form a flow tube and a sleeve. The flow tube includes an inlet, an outlet fluidly connected to the inlet and disposed on an opposite end of the flow tube from the inlet, and a sidewall extending between the inlet and the outlet. The sleeve extends through a portion of the flow tube and out of the sidewall and is configured to contain a portion of the J-tube.

An air conditioning pack includes an air cycle machine with a bearing cooling circuit, a condenser, a J-tube, and a shroud attached to the J-tube. The condenser includes an outlet header with an internal passage and is fluidly connected to the air cycle machine via a hose. The J-tube is fluidly connected to the internal passage and to the hose. An inlet of the J-tube is disposed within the internal passage of the outlet header of the condenser. The shroud includes a first partial shroud piece and a second partial shroud piece that mate together to form a flow tube and a sleeve. The flow tube includes an inlet, an outlet fluidly connected to the inlet and disposed on an opposite end of the flow tube from the inlet, and a sidewall extending between the inlet and the outlet. The sleeve extends through a portion of the flow tube and out of the sidewall and is configured to contain a portion of the J-tube.

A method of mounting a shroud onto a J-tube of an air conditioning pack includes accessing the J-tube located in a portion of a condenser outlet header of the air conditioning pack. A portion of the J-tube is enclosed in the sleeve by merging a first partial shroud piece with a second partial shroud piece about the J-tube such that the first partial shroud piece and second partial shroud piece combine to form a shroud including a flow tube, a sleeve, and a support rib. The flow tube includes an inlet, an outlet fluidly connected to the inlet and disposed on an opposite end of the flow tube from the inlet, and a sidewall extending between the inlet and the outlet. The sleeve extends through a portion of the flow tube and out of the sidewall and is configured to contain a portion of the J-tube. The support rib extends between and is connected to at least one of the flow tube and the sleeve. The support rib includes a planar strut configured to prevent relative motion between the flow tube and the sleeve of the shroud and to straighten a flow of fluid passing through the shroud.

BRIEF DESCRIPTION OF THE DRAWINGS

FIG. 5A is an exploded view of the J-tube, the shroud, and a support.

FIG. 5B is a perspective view of the J-tube, the shroud, and the support.

DETAILED DESCRIPTION

A shroud with a clamshell configuration is mounted to a J-tube of an ACM. The shroud eliminates turbulence at an inlet of the J-tube by straightening the flow of air passing across the J-tube and protecting the inlet of the J-tube from cross-flow disturbances thereby improving filtration efficiency. The shroud will improve the filtration efficiency by a factor of 10 times (from ~200 microns to ~20 microns). The shroud can also be installed in-situ avoiding the need for removing a complex air conditioning pack ("ACP") from the aircraft. An optional shroud support bracket supports the shroud and J-tube within the condenser header provides additional support to the J-tube/shroud assembly if required.

Figure 1:
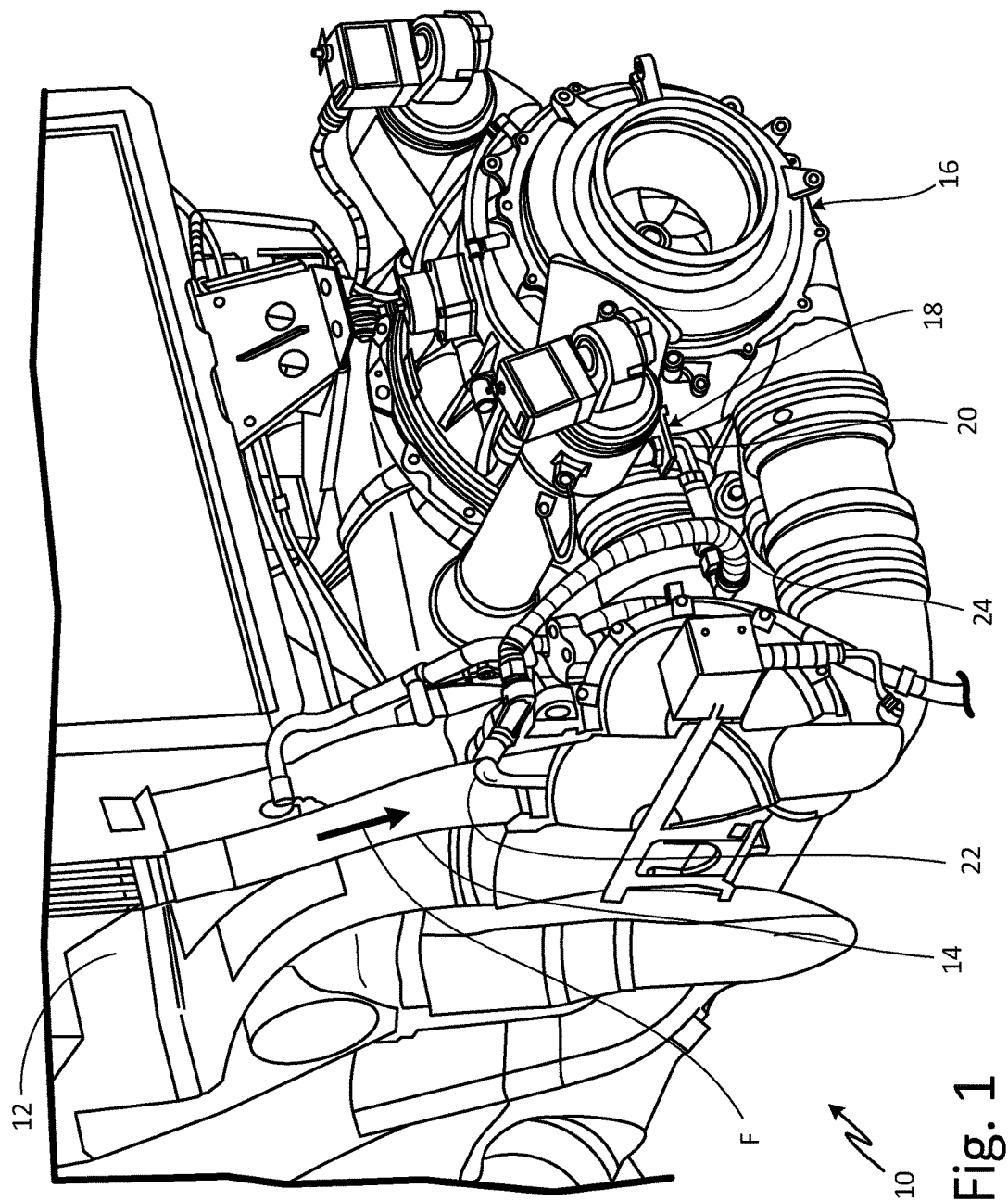
FIG. 1 is a perspective cross-section view of an air conditioning pack with a condenser, an air cycle machine, and a J-tube.

FIG. 1 shows a perspective cross-section view of ACP 10 (including condenser 12 with outlet header 14), ACM 16 (including bearing cooling circuit 18 with inlet 20), J-tube 22, and bearing cooling hose 24. FIG. 1 also depicts a flow direction of cooling flow F passing through outlet header 14 of condenser 12 and past J-tube 22.

ACP 10 is an air conditioning pack suitable for an aircraft. Condenser 12 is a component of ACP 10 configured to remove water from a flow of air passing through or across condenser 12. Outlet header 14 is a channel configured to pass a fluid, such as cooling flow F, through outlet header 14. ACM 16 is an air cycle machine of an aircraft. Bearing cooling circuit 18 is a cooling circuit for providing cooling air to a bearing chamber of ACM 16. Inlet 20 is a channel configured for passage of a fluid. J-tube 22 is a hollow tube in the general shape of a "J". Bearing cooling hose 24 is a hose configured to transport a fluid from J-tube 22 to inlet 20 of bearing cooling circuit 18. Cooling flow F is a flow of cooling air.

In one non-limiting embodiment, ACP 10 can be fluidly connected to an intermediate or high pressure stage of a gas turbine engine. Although ACP 10 is shown as including a single ACM 16, in other non-limiting embodiments ACP 10 can include a multi-ACM configuration such as a first air cycle machine and a second air cycle machine with first and second cooling inlets, respectively.

In one non-limiting embodiment, condenser 12 can be fluidly connected to one or more heat exchangers of ACP 10. Outlet header 14 of condenser 12 is attached and fluidly connected to condenser 12. ACM 16 is fluidly connected to condenser 12 via J-tube 22 and bearing cooling hose 24. Bearing cooling circuit 18 of ACM 16 is fluidly connected to outlet header 14 of condenser 12 via J-tube 22 and bearing cooling hose 24. Inlet 20 of bearing cooling circuit 18 extends outward from and is fluidly connected to bearing cooling circuit 18. J-tube 22 extends into and is fluidly connected to a flow path of outlet header 14 of condenser 12. J-tube 22 is also fluidly connected to ACM 16 via bearing cooling hose 24. Bearing cooling hose 24 is attached and fluidly connected to J-tube 22 and ACM 16.

As dehumidified flow F passes out of condenser 12 and through outlet header 14, J-tube 22 draws a portion of flow F from outlet header 14 into bearing cooling hose 24. J-tube 22 is oriented such that some of cooling flow F is drawn into J-tube in a direction opposite to a direction of cooling flow F through outlet header 14 of condenser 12. From bearing cooling hose 24, cooling flow F passes through inlet 20 and into bearing cooling circuit 18 of ACM 16. Cooling flow F from bearing cooling hose 24 is then used by bearing cooling circuit to cool bearings (not shown) in ACM 16.

However, contamination and water ingress into bearing cooling circuit 18 of ACM 16 from cooling flow F can degrade bearing capacity and contributes to premature failures of ACM 16 and ACP 10. The orientation of J-tube 22 (e.g., pointing in a downstream direction relative to cooling flow F in outlet header 14) is meant to function as preventing particulate and contaminants from being drawn up into J-tube 22. Computational fluid dynamics analysis has indicated turbulence at an inlet of J-tube 22 as a contributor for ingesting contaminates into the bearing cooling circuit of ACM 16.

Additional details of ACPs can be found in U.S. Pat. No. 7,188,488, which is herein incorporated by reference in its entirety. Additional details of ACMs can be found in co-pending U.S. patent application Ser. No. 14/180,777 filed on Feb. 14, 2014, which is herein incorporated by reference in its entirety.

Figure 2:
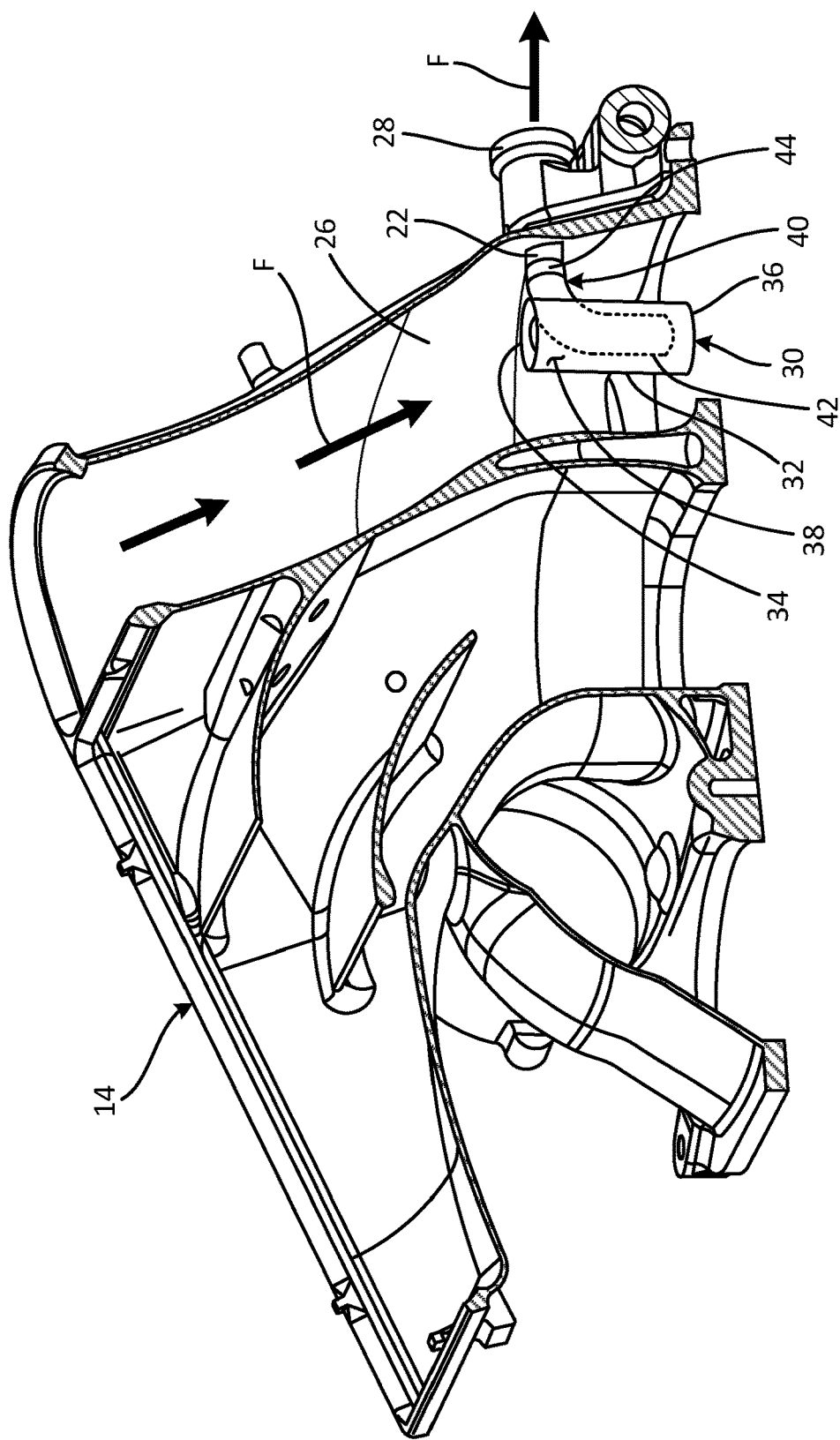
FIG. 2 is a cross-section view of an outlet header of the condenser and shows the J-tube and a shroud.

FIG. 2 is a cross-section view of outlet header 14 and shows J-tube 22, internal passage 26, outlet port 28 and shroud 30 (with flow tube 32 including inlet 34, outlet 36, and sidewall 38 and with sleeve 40 including first portion 42 and second portion 44).

Internal passage 26 is a fluidic passageway extending through a portion of outlet header 14. Outlet port 28 is a piece of solid material with a hole extending outwards from outlet header 14. Shroud 30 is a covering or case of solid material. In one non-limiting embodiment, a shape of shroud 30 can generally include a hollow cylinder. In another non-limiting embodiment, shroud 30 can be machined, investment cast, fabricated, additively manufactured on a layer-by-layer basis, or injection molded. Flow tube 32 and sleeve 40 are hollow cylinders of solid material. Inlet 34 and outlet 36 are holes in flow tube 32. Sidewall 38 is a hollow, cylindrically shaped piece of solid material. First portion 42 (shown in phantom in FIG. 2) and second portion 44 are tubular elements of solid material.

Internal passage 26 is disposed in a portion of outlet header 14 of condenser 12 and is fluidly connected to ACM 16 via J-tube 22. Outlet port 28 extends from outlet header 14 and is attached to bearing cooling hose 24. Shroud 30 is attached onto and encases a portion of J-tube 22. Flow tube 32 is disposed radially outward from sleeve 40. Flow tube 32 extends along a portion of internal passage 26. Flow tube 32 is generally aligned with a downstream direction of cooling flow F within internal passage 26. Inlet 34 is disposed on an upstream end (on a top end as shown in FIG. 2) of flow tube 32 and faces into cooling flow F. Outlet 36 is fluidly connected to inlet 34. Outlet 36 is disposed on a downstream end (on a bottom end as shown in FIG. 2) of flow tube 32 and faces in a direction towards the direction of flow of cooling flow F.

Sidewall 38 extends between inlet 34 and outlet 36. Sleeve 40 is disposed partially within and partially outside of flow tube 32. Sleeve 40 is configured to contain a portion of J-tube 22. First portion 42 is connected to and disposed within flow tube 32. Second portion 44 is connected to and extends outward from flow tube 32.

Shroud 30 functions to straighten cooling flow F as cooling flow F passes through shroud 30 and past J-tube 22. As a result of shroud 30 straightening the portion of cooling flow F passing across J-tube 22, turbulence of cooling flow F at an inlet of J-tube 22 is reduced or eliminated thereby improving filtration efficiency of J-tube 22. Straightening the flow adjacent to the inlet of J-tube 22 with shroud 30 will improve the filtration efficiency of the system from particulate (approximately 200 micrometer particulates to approximately 20 micrometers in size) from cooling flow F entering into ACM 16. Shroud 30 can be installed in-situ thereby avoiding significant maintenance tasks associated with removing and disassembling APC 10, which can be complex.

Figure 3B:
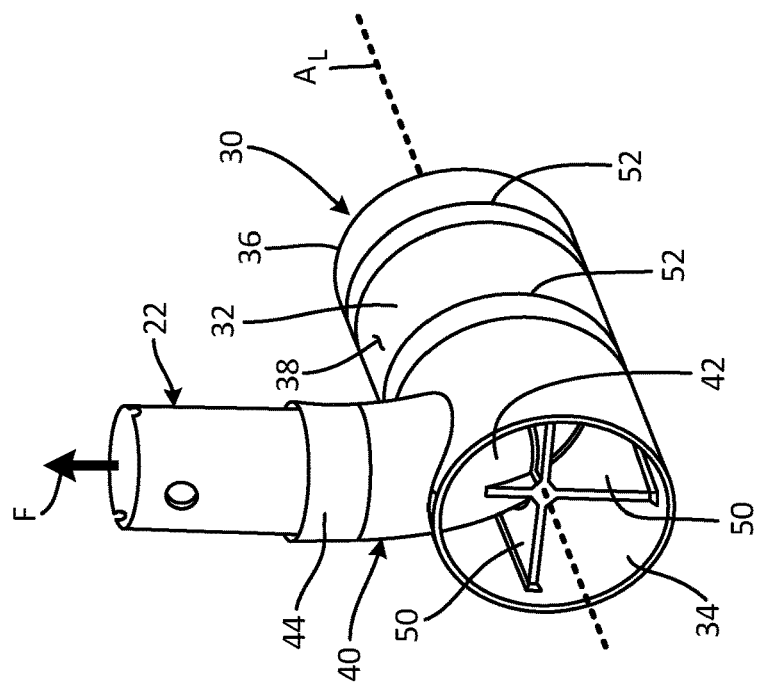
FIG. 3B is a perspective view of the J-tube and the shroud.
Figure 3A:
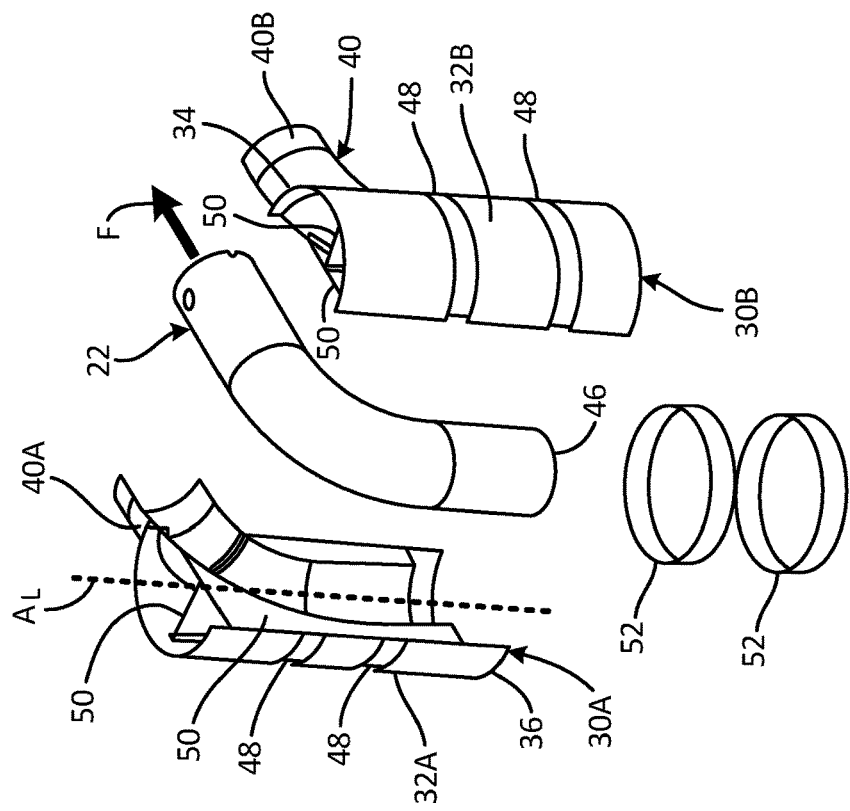
FIG. 3A is an exploded view of the J-tube and the shroud.

FIG. 3A is an exploded view of J-tube 22 and shroud 30 and shows J-tube 22 (with inlet 46), and shroud 30 with longitudinal axis $A_L$, first partial shroud piece 30A (with first half 32A of flow tube 32 and first half 40A of sleeve 40), second partial shroud piece 30B (with second half 32B of flow tube 32 and second half 40B of sleeve 40), flow tube 32 (including inlet 34, outlet 36, and sidewall 38), sleeve 40 (including first portion 42 and second portion 44), slots 48, support ribs 50, retention features 52, and cooling flow F. FIG. 3B is a perspective view of shroud 30 assembled onto J-tube 22 and rotated approximately 90° clockwise from FIG. 3A. FIGS. 3A and 3B include similar elements and thus will be discussed in unison.

Inlet 46 is an opening or orifice in J-tube 22. Longitudinal axis $A_L$ is an axis passing through a center of flow tube 32 and extending in a longitudinal direction relative to shroud 30 (as shown in FIGS. 3A and 3B). First partial shroud piece 30A and second partial shroud piece 30B are two halves of shroud 30. First partial shroud piece 30A and second partial shroud piece 30B are symmetric to each other along longitudinal axis $A_L$ of shroud 30. First half 32A and second half 32B are corresponding halves of flow tube 32 that are symmetric across longitudinal axis $A_L$ of shroud 30. First half 40A and second half 40B are corresponding halves of sleeve 40 that are symmetric across longitudinal axis $A_L$ of shroud 30. Slots 48 are indents or recesses in sidewall 38. In one non-limiting embodiment, slots 48 can include more or less than two slots 48. Support ribs 50 are fins or planar struts of solid material. Retention features 52 are rings of solid material. In some non-limiting embodiment, retention features 52 can include tie wraps, fixed collars, molded snap features, fasteners, or other affixing apparatuses.

Outlet 36 of flow tube 32 extends past inlet 46 of J-tube 22. Inlet 46 of J-tube 22 is disposed in and is fluidly connected to flow tube 32. First partial shroud piece 30A and second partial shroud piece 30B are connected along an interface between the two pieces (as shown in FIG. 3A). In some non-limiting embodiments, first partial shroud piece 30A and second partial shroud piece 30B can be attached and/or affixed to one another using mechanical, chemical, and/or adhesive attachment means. In one non-limiting embodiment, a room temperature vulcanization silicone or a liquid shim can be placed between J-tube 22 and first and second partial shroud pieces 46 and 48. In another non-limiting embodiment, first partial shroud piece 30A and second partial shroud piece 30B can be bonded to J-tube 22.

First half 32A and second half 32B are in contact with each other along longitudinal axis $A_L$ (as shown in FIG. 3B) and form flow tube 32. First half 32A and second half 32B are symmetrically opposed across longitudinal axis $A_L$ of shroud 30. First half 40A and second half 40B are in contact with each other along longitudinal axis $A_L$ (as shown in FIG. 3B) and form sleeve 40. First half 40A and second half 40B are symmetrically opposed across longitudinal axis $A_L$ of shroud 30.

Slots 48 are disposed in sidewall 38 of flow tube 32. In one non-limiting embodiment, slots 48 can extend around a circumference of flow tube 32. Support ribs 50 extend between and are connected to at least one of flow tube 32 and sleeve 40. Retention features 52 are disposed within slots 48 and surround first partial shroud piece 30A and second partial shroud piece 30B of shroud 30 (as shown in FIG. 3B). As shown in FIG. 3A, retention features 52 are removable from shroud 30 and can be slid on and off of first partial shroud piece 30A and second partial shroud piece 30B of shroud 30. Retention features 52 are attached to flow tube 32.

Outlet 36 of flow tube 32 extends past inlet 46 of J-tube 22. J-tube 22 functions to protect inlet 46 from crossflow disturbances of cooling flow F that cause ingress of contaminants into inlet 46. First partial shroud piece 30A and second partial shroud piece 30B provide a clamshell configuration allowing shroud 30 to be installed onto J-tube 22 inside of outlet header 14 without needing to remove ACU 10 from the aircraft. A clearance between J-tube 22 and first and second partial shroud pieces 46 and 48 enables fit-up and bonding of shroud 30 to J-tube 22. Bonding of shroud 30 to J-tube 22 eliminates any clearance between shroud 30 and J-tube 22 to provide a unitized and more stable structure.

Slots 48 provide a recess for receiving retention features 52. Slots 48 also engage with retention features 52 so as to prevent retention features 52 from becoming dislodged or disengaged from flow tube 32 during operation of ACP 10. Support ribs 50 are configured to prevent relative motion between flow tube 32 and sleeve 40 of shroud 30. Support ribs 50 are also configured to straighten a flow of cooling fluid F that passes through flow tube 32 of shroud 30. Retention features 52 are configured to secure first partial shroud piece 30A and second partial shroud piece 30B together and to secure shroud 30 to J-tube 22.

As cooling flow F is straightened by support ribs 50, the turbulence of cooling flow F at inlet 46 of J-tube 22 is further reduced thereby improving filtration efficiency of J-tube 22 by reducing the amount of particulate and contaminate drawn into J-tube 22 and ultimately into the cooling bearing circuit of ACM 16. As discussed above, the two-piece clamshell configuration of shroud 30 enables shroud 30 to be installed into outlet header 14 without needing to completely disassemble or remove ACP 10 from the aircraft in order to install shroud 30 onto J-tube 22.

Figure 4:
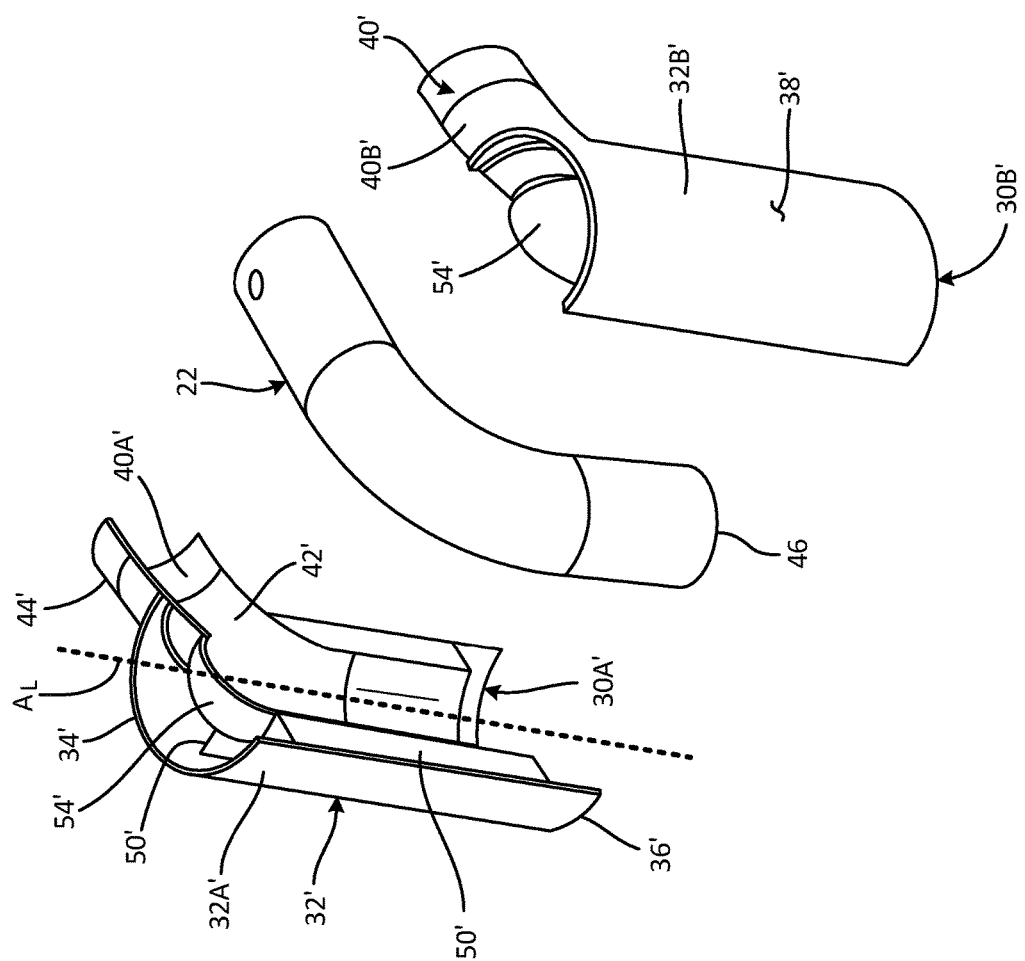
FIG. 4 is an exploded view of the J-tube and a shroud.

FIG. 4 is an exploded view of J-tube 22 and shroud 30' and shows J-tube 22 (with inlet 46), and shroud 30' with longitudinal axis $A_L$, first partial shroud piece 30A' (with first half 32A' of flow tube 32' and first half 40A' of sleeve 40'), second partial shroud piece 30B' (with second half 32B' of flow tube 32' and second half 40B' of sleeve 40'), flow tube 32' (including inlet 34', outlet 36', and sidewall 38'), sleeve 40' (including first portion 42' and second portion 44'), support ribs 50', nose 54', and cooling flow F. FIG. 4 include similar elements as those shown in FIGS. 3A and 3B with the addition of nose 54' (and the omission of slots 48 and retention features 52). For example, "first half 32A'" in FIG. 4 corresponds to "first half 32A" in FIGS. 3A and 3B.

Nose 54' is a rounded dome shaped piece of solid material. In other non-limiting embodiments, nose 54' can include other geometrical shapes configured to divert all or a portion cooling flow F towards sidewall 38' of flow tube 32'. Nose 54' is attached to at least one of support ribs 50' and sleeve 40'. Nose 54' is disposed on an upstream end of support ribs 50'. Nose 54' is configured to reduce a pressure drop of cooling flow F (e.g., fluid) passing through flow tube 32' of shroud 30'. This reduction in pressure drop of cooling flow F further reduces the turbulence of cooling flow F at inlet 46 of J-tube 22 thereby increasing the filtration efficiency of J-tube 22.

Figure 5C:
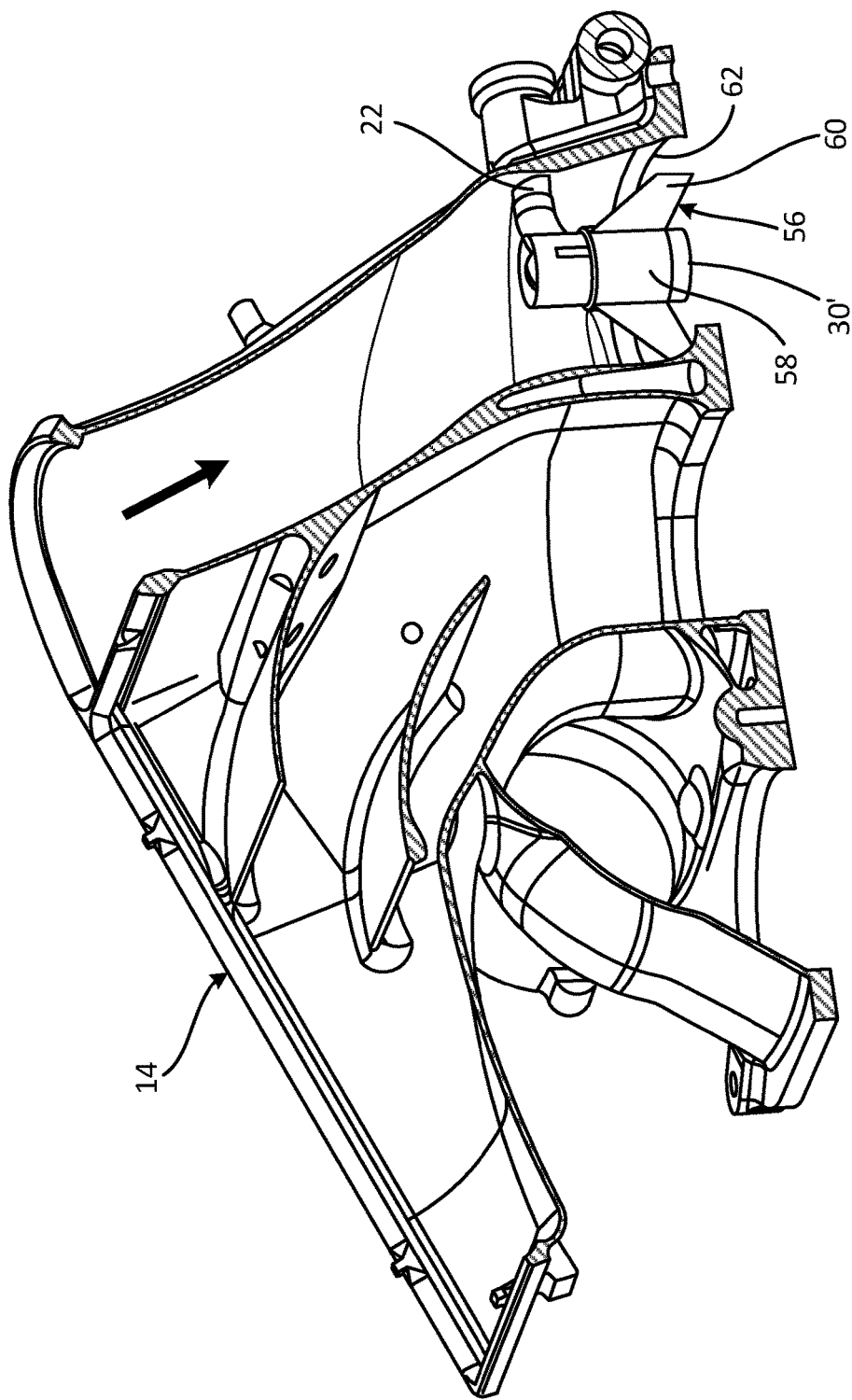
FIG. 5C is cross-section view of the outlet header of the condenser and shows the J-tube, the shroud, and the support.

FIG. 5A is an exploded view of J-tube 22, shroud 30', and support 56 and shows J-tube 22 (with inlet 46), shroud 30' (with first partial shroud piece 30A' and second partial shroud piece 30B'), flow tube 32', sleeve 40', support ribs 50, nose 54', and support 56 (with collar 58, struts 60, and band 62). FIG. 5B is a perspective view of shroud 30' assembled onto J-tube 22 and support 56 mounted onto shroud 30'. FIG. 5C is cross-section view of outlet header 14 of condenser 12 and shows outlet header 14, J-tube 22, shroud 30', and support 56 (with collar 58, struts 60, and band 62). FIGS. 5A, 5B, and 5C include the same or similar elements and will therefore be discussed in unison.

Support 56 is a bracket or brace of solid material. In one non-limiting embodiment, support 56 can be machined, investment cast, fabricated, additively manufactured on a layer-by-layer basis, or injection molded. Collar 58 is a tube of solid material. Struts 60 are fins or planar struts of solid material. In one non-limiting embodiment, struts 60 can include more or less than three struts. In other non-limiting embodiments, struts 60 can include non-linear or non-planar shapes. Band 62 is a circular ribbon or thin sheet of solid material.

Support 56 is mounted or attached onto shroud 30'. Collar 58 is connected to struts 60. Collar 58 surrounds, is in contact with, and is mounted onto flow tube 32' of shroud 30'. Struts 60 are connected to and extend radially outwards from collar 58. Struts 60 are also attached to band 62. Band 62 surrounds a portion of collar 58, is connected to strut 60, and is in contact with a portion of outlet header 14 (as shown in FIG. 5C).

When support element 56 and shroud 30' are installed onto J-tube 22 (as shown in FIG. 5C), band 62 is in contact with a portion of outlet header 44 to brace support element 56 against outlet header 14 to prevent relative motion between J-tube 22 and outlet header 14. In existing ACP's, there can be issues with the J-tube to outlet header bond joint failing due to excessive relative motion between the J-tube and the outlet header. Support 56 eliminates relative motion between J-tube 22 and outlet header 14 thereby reducing fatigue on a bond joint e.g., mechanical or chemical interface) between J-tube 22 and outlet header 14 and extending the life of J-tube 22 in ACP 10.

Figure 6:
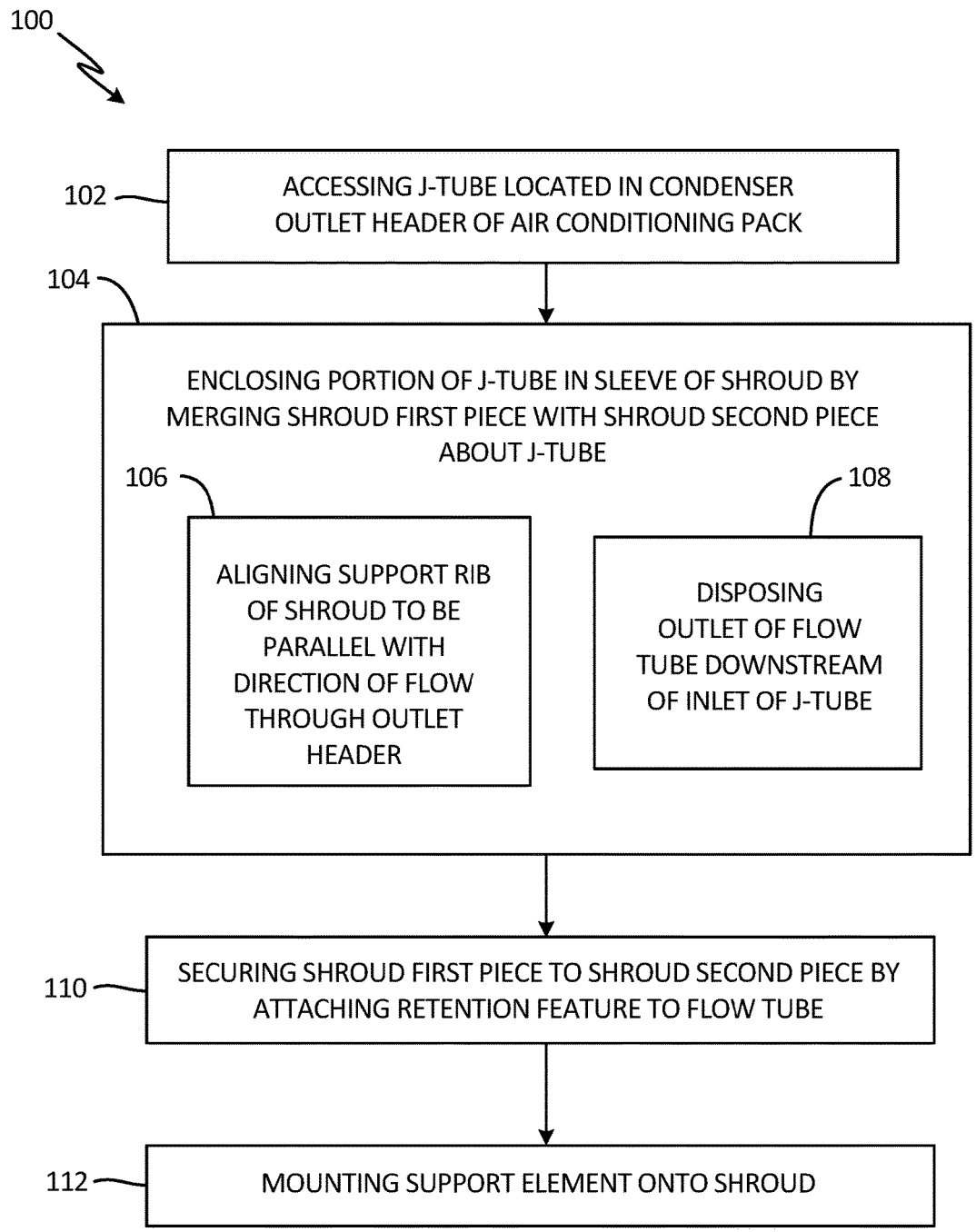
FIG. 6 is a flowchart of a method of mounting the shroud onto the J-tube of the air conditioning pack.

FIG. 6 is a flowchart of method 100 of mounting shroud 30 onto J-tube 22 ACP 10. Method 100 includes steps 102-112. Method 100 discusses shroud 30 and its corresponding elements, however it should be understood that method 100 also extends to shroud 30' as discussed in FIGS. 4-5C.

Step 102 includes accessing J-tube 22 located in a portion of outlet header 14 of ACP 10. Step 104 includes enclosing a portion of J-tube 22 in sleeve 40 by merging first partial shroud piece 30A with second partial shroud piece 30B about J-tube 22 such that first partial shroud piece 30A and second partial shroud piece 30B combine to form shroud 30. Step 104 also includes steps 106 and 108. Step 106 includes aligning support ribs 50 of shroud 30 to be parallel with a direction of cooling flow F through outlet header 14. Step 108 includes disposing outlet 36 of flow tube 32 downstream of inlet 46 of J-tube 22. Step 110 includes securing first partial shroud piece 30A to second partial shroud piece 30B by attaching retention features 52 to flow tube 32. Step 112 includes mounting support element 56 onto shroud 30 such that support element 56 is attached to shroud 30, extends between shroud 30 and outlet header 14, and support element 56 is configured to prevent relative motion between J-tube 22 and outlet header 14. In one non-limiting embodiment, step 112 can be considered an option for upgrading existing J-tubes that require additional structural support, avoiding the need for the complex removal and rework of an ACP.

Discussion of Possible Embodiments

The following are non-exclusive descriptions of possible embodiments of the present invention.

A shroud for a J-tube of an air conditioning pack of an aircraft includes a first partial shroud piece and a second partial shroud piece that mate together to form a flow tube and a sleeve. The flow tube includes an inlet, an outlet fluidly connected to the inlet and disposed on an opposite end of the flow tube from the inlet, and a sidewall extending between the inlet and the outlet. The sleeve extends through a portion of the flow tube and out of the sidewall and is configured to contain a portion of the J-tube.

The shroud of the preceding paragraph can optionally include, additionally and/or alternatively, any one or more of the following features, configurations and/or additional components.

A retention feature can be attached to the flow tube, wherein the retention feature can be configured to secure the first and second partial shroud pieces together and/or to secure the shroud to the J-tube.

A support rib can extend between and can be connected to at least one of the flow tube and the sleeve.

The support rib can comprise a planar strut that can be configured to prevent relative motion between the flow tube and the sleeve of the shroud and/or can straighten a flow of fluid passing through the shroud.

The outlet of the flow tube can be configured to extend past an inlet of the J-tube.

An air conditioning pack includes an air cycle machine with a bearing cooling circuit, a condenser, a J-tube, and a shroud attached to the J-tube. The condenser includes an outlet header with an internal passage and is fluidly connected to the air cycle machine via a hose. The J-tube is fluidly connected to the internal passage and to the hose. An inlet of the J-tube is disposed within the internal passage of the outlet header of the condenser. The shroud includes a first partial shroud piece and a second partial shroud piece that mate together to form a flow tube and a sleeve. The flow tube includes an inlet, an outlet fluidly connected to the inlet and disposed on an opposite end of the flow tube from the inlet, and a sidewall extending between the inlet and the outlet. The sleeve extends through a portion of the flow tube and out of the sidewall and is configured to contain a portion of the J-tube.

The air conditioning pack of the preceding paragraph can optionally include, additionally and/or alternatively, any one or more of the following features, configurations and/or additional components.

The outlet of the flow tube of the shroud can extend past the inlet of the J-tube.

A support rib can extend between the flow tube and the sleeve, wherein the support rib can be configured to prevent relative motion between the flow tube and the sleeve of the shroud.

A nose can be disposed on an upstream end of the support rib, wherein the nose can be configured to reduce a pressure drop of a fluid passing through the shroud.

The nose can comprise a rounded shape.

The support rib can be configured to straighten a flow of fluid passing through the shroud.

A retention feature can be attached to the flow tube, wherein the retention feature can be configured to secure the first partial shroud piece and the second partial shroud piece of the shroud together and/or secure the shroud to the J-tube.

A support element can be attached to the shroud and can extend between the shroud and the outlet header, wherein the support element can comprise a tubular collar that can be surrounding and/or in contact with the flow tube of the shroud, a strut that can be connected to and/or extend outwards from the collar, and a band that can be surrounding a portion of the collar, wherein the band can be connected to the strut and/or can be in contact with a portion of the outlet header.

The band of the support element can be in contact with the outlet header of the condenser to brace the support element against the outlet header and/or to prevent relative motion between the J-tube and the outlet header.

A method of mounting a shroud onto a J-tube of an air conditioning pack includes accessing the J-tube located in a portion of a condenser outlet header of the air conditioning pack. A portion of the J-tube is enclosed in the sleeve by merging a first partial shroud piece with a second partial shroud piece about the J-tube such that the first partial shroud piece and second partial shroud piece combine to form a shroud including a flow tube, a sleeve, and a support rib. The flow tube includes an inlet, an outlet fluidly connected to the inlet and disposed on an opposite end of the flow tube from the inlet, and a sidewall extending between the inlet and the outlet. The sleeve extends through a portion of the flow tube and out of the sidewall and is configured to contain a portion of the J-tube. The support rib extends between and is connected to at least one of the flow tube and the sleeve. The support rib includes a planar strut configured to prevent relative motion between the flow tube and the sleeve of the shroud and to straighten a flow of fluid passing through the shroud.

The air conditioning pack of the preceding paragraph can optionally include, additionally and/or alternatively, any one or more of the following features, configurations, steps, and/or additional components.

The support rib of the shroud can be aligned to be parallel with a direction of flow through the outlet header.

The outlet of the flow tube can be disposed downstream of the inlet of the J-tube.

The first partial shroud piece can be secured to the second partial shroud piece by attaching a retention feature to the flow tube.

A support element can be mounted onto the shroud such that the support element can be attached to the shroud, can extend between the shroud and the outlet header, and the support element can be configured to prevent relative motion between the J-tube and the outlet header.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A shroud for a J-tube of an air conditioning pack of an aircraft, the shroud comprising:
   a first partial shroud piece;
   a second partial shroud piece that mates with the first partial shroud piece to form:
      a flow tube comprising:
         an inlet;
         an outlet fluidly connected to the inlet and disposed on an opposite end of the flow tube from the inlet; and
         a sidewall extending between the inlet and the outlet; and
      a sleeve extending through a portion of the flow tube and out of the sidewall, wherein the sleeve is configured to contain a portion of the J-tube.

2. The shroud of claim 1 and further comprising a retention feature attached to the flow tube, wherein the retention feature is configured to secure the first and second partial shroud pieces together and to secure the shroud to the J-tube.

3. The shroud of claim 1 and further comprising a support rib extending between and connected to at least one of the flow tube and the sleeve.

4. The shroud of claim 3, wherein the support rib comprises a planar strut configured to prevent relative motion between the flow tube and the sleeve of the shroud and to straighten a flow of fluid passing through the shroud.

5. The shroud of claim 1, wherein the outlet of the flow tube is configured to extend past an inlet of the J-tube.

6. An air conditioning pack comprising:
   an air cycle machine with a bearing cooling circuit;
   a condenser fluidly connected to the air cycle machine via a hose, wherein the condenser comprises an outlet header with an internal passage;
   a J-tube with an inlet disposed within the internal passage of the outlet header of the condenser, wherein the J-tube is fluidly connected to the internal passage and to the hose; and
   a shroud attached to the J-tube, wherein the shroud comprises:
      a first partial shroud piece;
      a second partial shroud piece that mates with the first partial shroud piece to form:
         a flow tube comprising:
            an inlet;
            an outlet fluidly connected to the inlet and disposed on an opposite end of the flow tube from the inlet; and
            a sidewall extending between the inlet and the outlet; and
         a sleeve extending through a portion of the flow tube and out of the sidewall, wherein the sleeve is configured to contain a portion of the J-tube.

7. The air conditioning pack of claim 6, wherein the outlet of the flow tube extends past the inlet of the J-tube.

8. The air conditioning pack of claim 6 and further comprising a support rib extending between the flow tube and the sleeve, wherein the support rib is configured to prevent relative motion between the flow tube and the sleeve of the shroud.

9. The air conditioning pack of claim 8, wherein the shroud further comprises a nose disposed on an upstream end of the support rib, wherein the nose is configured to reduce a pressure drop of a fluid passing through the shroud.

10. The air conditioning pack of claim 9, wherein the nose comprises a rounded shape.

11. The air conditioning pack of claim 8, wherein the support rib is configured to straighten a flow of fluid passing through the shroud.

12. The air conditioning pack of claim 6 and further comprising a retention feature attached to the flow tube, wherein the retention feature is configured to secure the first partial shroud piece and the second partial shroud piece of the shroud together and secure the shroud to the J-tube.

13. The air conditioning pack of claim 6 and further comprising a support element attached to the shroud and extending between the shroud and the outlet header, wherein the support element comprises:
   a tubular collar surrounding and in contact with the flow tube of the shroud;
   a strut connected to and extending outwards from the collar; and
   a band surrounding a portion of the collar, wherein the band is connected to the strut and is in contact with a portion of the outlet header.

14. The air conditioning pack of claim 13, wherein the band of the support element is in contact with the outlet header of the condenser to brace the support element against the outlet header and to prevent relative motion between the J-tube and the outlet header.

15. A method of mounting a shroud onto a J-tube of an air conditioning pack, the method comprising:
   accessing the J-tube located in a portion of a condenser outlet header of the air conditioning pack; and
   enclosing a portion of the J-tube in the sleeve by merging a first partial shroud piece with a second partial shroud piece about the J-tube such that the first partial shroud piece and second partial shroud piece combine to form a shroud comprising:
      a flow tube comprising:
         an inlet;
         an outlet fluidly connected to the inlet and disposed on an opposite end of the flow tube from the inlet; and
         a sidewall extending between the inlet and the outlet;
      a sleeve extending through a portion of the flow tube and out of the sidewall, wherein the sleeve is configured to contain a portion of the J-tube; and
      a support rib extending between and connected to at least one of the flow tube and the sleeve, wherein the support rib comprises a planar strut configured to prevent relative motion between the flow tube and the sleeve of the shroud and to straighten a flow of fluid passing through the shroud.

16. The method of claim 15 and further comprising aligning the support rib of the shroud to be parallel with a direction of flow through the outlet header.

17. The method of claim 15 and further comprising disposing the outlet of the flow tube downstream of the inlet of the J-tube.

18. The method of claim 15 and further comprising securing the first partial shroud piece to the second partial shroud piece by attaching a retention feature to the flow tube.

19. The method of claim 15 and further comprising mounting a support element onto the shroud such that the support element is attached to the shroud, extends between the shroud and the outlet header, and the support element is configured to prevent relative motion between the J-tube and the outlet header.

* * * * *